C. H. HACKETT & T. W. MORGAN.
CENTRIFUGAL CREAM SEPARATOR.
APPLICATION FILED AUG. 26, 1910.

1,011,192.

Patented Dec. 12, 1911.

WITNESSES:
H. B. Burr.
Ed Ferris.

INVENTORS
C. H. Hackett and
Thomas W. Morgan

BY G. C. Kennedy
ATTORNEY

UNITED STATES PATENT OFFICE.

CHARLES H. HACKETT AND THOMAS W. MORGAN, OF WATERLOO, IOWA, ASSIGNORS TO WILBUR W. MARSH, OF WATERLOO, IOWA.

CENTRIFUGAL CREAM-SEPARATOR.

1,011,192.

Specification of Letters Patent.   Patented Dec. 12, 1911.

Application filed August 26, 1910.   Serial No. 579,029.

*To all whom it may concern:*

Be it known that we, CHARLES H. HACKETT and THOMAS W. MORGAN, citizens of the United States of America, and residents of Waterloo, Blackhawk county, Iowa, have invented certain new and useful Improvements in Centrifugal Cream-Separators, of which the following is a specification.

Figure 1:
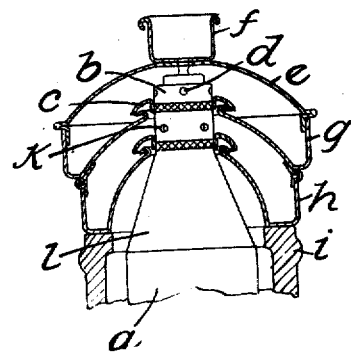
Figure 2:

Our invention relates to improvements in centrifugal cream separators, and the object of our improvement is to prevent an indraft or seepage of either milk or cream particles between a receiving-pan and the milk or cream exit of a separator-bowl, through the annular space between said pan and bowl, by reason of a suction caused upon said annular space by reason of the downwardly-directed air-currents generated by the rapidly-rotating bowl. This object we have effected by the means which are hereinafter described and claimed, and which are illustrated in the accompanying drawings, in which:

Figure 1 is a broken side elevation of a cream separator bowl, with the milk and cream receiving-pans supported concentrically about its head, said pans and their supports being shown in vertical transverse section. Fig. 2 is a vertical central axial section of the deflecting-ring used by us to effect the purpose above set forth.

Similar characters of reference designate corresponding parts throughout the several views.

The rotary cream separator bowl $a$ has a conical truncated part $l$ and a cylindrical head $b$ of less diameter. Said head $b$ has milk-exits $k$ and cream-exits $d$, for separately discharging the separated milk or cream into the concentrically located pans $h$ and $g$ about said bowl. Both pans are of annular shape, with their inner edges in each case spaced apart a proper distance from the bowl-head $b$ to provide space for the oscillation of said bowl therein when being rotated rapidly. The pan $g$ is superposed on the pan $h$, the bottom of the former serving as a cover for the latter, while the upper pan $g$ is provided with a removable centrally orificed cover $e$, a full-milk conduit $f$ lying thereabove and adapted to discharge its contents into the bowl $a$. The lowermost pan $h$ is supported on a body $i$.

When the bowl $a$ is placed in rapid rotation, as in use, its friction with the surrounding air layer induces movement in the latter, the air tending to follow the bowl's rotation horizontally about the widest diameter of the bowl. On account of the gradual lessening of the diameter of the conical part $l$ of the head to the part $b$ of least diameter, the air movement is greatest about the part $a$, less about the part $l$ and least about the head $b$ in circumferential rotation. The net result is to cause the air to flow in obliquely and downwardly directed currents toward the space about the part $a$. This creates a suction upon the annular spaces between the inner edges of the pans $h$ and $g$ and the bowl-head $b$, which has enough power to cause a seepage of a part of the misty contents of said pans between said bowl-head $b$ and the inner edges of the pans. This causes the cream in the upper pan $g$ to seep into the lower milk-receiving pan $h$, while in like manner a portion of the contents of the pan $h$ escapes downward along the bowl. To prevent this seepage caused by the said suction, we fit a removable ring or thimble $m$ about the head $b$, one of such thimbles near each of the inner edges of said pans $h$ and $g$, and each thimble is fitted closely enough as to prevent leakage between itself and the head $b$, and ordinarily rotates with the bowl, but not necessarily so. Each thimble $m$ is provided with an outwardly-directed flange $c$, which as shown is preferably curved downward so as to overhang the adjacent inner edge of the abutting receiving-pan, but preferably not touching the latter. The space between the overhanging flange $c$ and the inner edge of the pan is so narrow, and the passage between them so tortuous or indirect, that the suction of the air-draft below has insufficient power to draw the contents of the pan therethrough. The flange $c$ is interposed in such a way, that any of the finely divided or vaporized contents of the pan which may move toward it is deflected back into the pan. The net result is to keep the contents of the pans distinct and unmixed, and prevent exudation of the contents of either so as to seep over the exterior of the bowl. It is obvious, that this principle of intercepting any seepage from the pans, will cover the use of the device whether used with pans so placed as to receive from bowls having exits at or near their bottoms, as well as at the top, and that the flanges of such thimbles may be directed outwardly at different angles, or that the thimbles themselves may be made of a sufficient thickness or other form as to serve the purpose desired.

Having described our invention, what we claim as new, and desire to secure by Letters Patent, is:

The combination with a centrifugal cream separator bowl having an exit for a part of its separated contents, of a receiving vessel supported near said exit concentrically about the bowl but closely spaced away therefrom, and a removable thimble seated upon said bowl, one part of said thimble being bent outwardly then downwardly directed and adapted to completely overhang the receiving edge of said vessel so as to prevent seepage of the contents of the latter over its receiving edge due to suction generated by the air currents moving about said bowl.

Signed at Waterloo, Iowa, this 8th day of Aug. 1910.

CHARLES H. HACKETT.
THOMAS W. MORGAN.

Witnesses:
O. D. YOUNG,
G. C. KENNEDY.